US009354987B2

(12) United States Patent
Zhang et al.

(10) Patent No.: US 9,354,987 B2
(45) Date of Patent: *May 31, 2016

(54) SYSTEMS AND METHODS FOR OUT-OF-BAND BACKUP AND RESTORE OF HARDWARE PROFILE INFORMATION

(71) Applicants: Weijia Zhang, Round Rock, TX (US); Jon R. Hass, Austin, TX (US); William C. Edwards, Round Rock, TX (US)

(72) Inventors: Weijia Zhang, Round Rock, TX (US); Jon R. Hass, Austin, TX (US); William C. Edwards, Round Rock, TX (US)

(73) Assignee: Dell Products LP, Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/845,835

(22) Filed: Sep. 4, 2015

(65) Prior Publication Data
US 2015/0378844 A1  Dec. 31, 2015

Related U.S. Application Data

(63) Continuation of application No. 13/365,901, filed on Feb. 3, 2012, now Pat. No. 9,146,812.

(51) Int. Cl.
G06F 11/14 (2006.01)

(52) U.S. Cl.
CPC ........ *G06F 11/1469* (2013.01); *G06F 11/1415* (2013.01); *G06F 11/1451* (2013.01); *G06F 11/1456* (2013.01); *G06F 11/1464* (2013.01); G06F 2201/84 (2013.01)

(58) Field of Classification Search
CPC ............ G06F 11/1415; G06F 11/1456; G06F 11/1464; G06F 11/1469
See application file for complete search history.

(56) References Cited

U.S. PATENT DOCUMENTS

| 5,603,005 | A  | 2/1997  | Bauman et al. |
| 5,717,942 | A  | 2/1998  | Haupt et al. |
| 6,108,697 | A  | 8/2000  | Raymond et al. |
| 6,144,992 | A  | 11/2000 | Turpin et al. |
| 6,298,443 | B1 | 10/2001 | Colligan et al. |
| 6,336,161 | B1 | 1/2002  | Watts |
| 6,408,334 | B1 | 6/2002  | Bassman et al. |
| 6,470,446 | B1 | 10/2002 | Beelitz et al. |
| 6,519,679 | B2 | 2/2003  | Devireddy et al. |
| 6,763,458 | B1 | 7/2004  | Watanabe et al. |
| 6,820,214 | B1 | 11/2004 | Cabrera et al. |
| 6,854,122 | B1 | 2/2005  | Sheriff et al. |
| 6,973,587 | B1 | 12/2005 | Maity et al. |
| 7,028,138 | B2 | 4/2006  | Ali et al. |
| 7,216,200 | B2 | 5/2007  | Zhang et al. |
| 7,272,815 | B1 | 9/2007  | Eldridge et al. |
| 7,360,211 | B2 | 4/2008  | Hyden et al. |

(Continued)

OTHER PUBLICATIONS

IBM, "Navigator for I", Printed From Internet May 26, 2009, 3 pgs.
IBM, "IBM iSeries Navigator System Management Plug-In for SAP", Printed From Internet May 26, 2009, 1 pg.
Business Wire; Business Services Industry, "F5 and Oracle Collaborate to Release Big-Ip Load Balancer System Management Plug-In for Oracle Enterprise Manager 10g Grid Control", Oct. 31, 2005, 10 pgs.

(Continued)

*Primary Examiner* — Aracelis Ruiz
(74) *Attorney, Agent, or Firm* — Egan, Peterman, Enders & Huston LLP

(57) ABSTRACT

Systems and methods are provided that may be implemented for out-of-band backup and/or restore of information handling system components. Such out-of-band backup and restore operations may be performed, in one embodiment, to backup and/or restore hardware profile information such as firmware images and corresponding system configuration information.

20 Claims, 5 Drawing Sheets

(56) References Cited

U.S. PATENT DOCUMENTS

| | | | |
|---|---|---|---|
| 7,409,575 | B2 | 8/2008 | Komarla et al. |
| 7,426,052 | B2 | 9/2008 | Cox et al. |
| 7,430,592 | B2 | 9/2008 | Schmidt et al. |
| 7,526,541 | B2 | 4/2009 | Roese et al. |
| 7,610,575 | B2 | 10/2009 | Sproule |
| 7,660,913 | B2 | 2/2010 | Zimmer et al. |
| 7,706,369 | B2 | 4/2010 | Roese et al. |
| 7,739,372 | B2 | 6/2010 | Roese et al. |
| 7,739,402 | B2 | 6/2010 | Roese et al. |
| 7,765,371 | B2 | 7/2010 | Abels et al. |
| 7,805,533 | B2 | 9/2010 | Burns et al. |
| 7,877,614 | B2 | 1/2011 | Frenkiel et al. |
| 7,895,428 | B2 | 2/2011 | Boland et al. |
| 7,898,977 | B2 | 3/2011 | Roese et al. |
| 7,945,945 | B2 | 5/2011 | Graham et al. |
| 8,086,834 | B2 | 12/2011 | Brisky et al. |
| 8,086,838 | B2 | 12/2011 | Harmer |
| 8,099,624 | B1 | 1/2012 | Saxena et al. |
| 8,191,107 | B1 | 5/2012 | Frattura et al. |
| 8,260,841 | B1 | 9/2012 | Maity |
| 8,261,044 | B2 | 9/2012 | Kimstler |
| 8,407,662 | B2 | 3/2013 | Lam |
| 8,510,422 | B2 | 8/2013 | Phung et al. |
| 8,650,556 | B2 | 2/2014 | McNeill |
| 8,832,369 | B2 | 9/2014 | Zhang et al. |
| 8,838,848 | B2 | 9/2014 | Zhang et al. |
| 8,966,026 | B2 | 2/2015 | Phung et al. |
| 9,032,214 | B2 | 5/2015 | Karandikar et al. |
| 2003/0216143 | A1 | 11/2003 | Roese et al. |
| 2004/0162857 | A1 | 8/2004 | Butts |
| 2005/0027837 | A1 | 2/2005 | Roese et al. |
| 2005/0055688 | A1 | 3/2005 | Barajas et al. |
| 2005/0066015 | A1 | 3/2005 | Dandekar et al. |
| 2005/0076245 | A1 | 4/2005 | Graham et al. |
| 2005/0166213 | A1 | 7/2005 | Cromer et al. |
| 2005/0172280 | A1 | 8/2005 | Ziegler et al. |
| 2005/0216664 | A1 | 9/2005 | Taninaka et al. |
| 2005/0237996 | A1 | 10/2005 | Sakuraba et al. |
| 2006/0018505 | A1 | 1/2006 | Cherian et al. |
| 2006/0031936 | A1 | 2/2006 | Nelson et al. |
| 2006/0036730 | A1 | 2/2006 | Graham et al. |
| 2006/0048142 | A1 | 3/2006 | Roese et al. |
| 2006/0075093 | A1 | 4/2006 | Frattura et al. |
| 2006/0190532 | A1 | 8/2006 | Chadalavada |
| 2006/0212143 | A1 | 9/2006 | Nguyen et al. |
| 2007/0067565 | A1* | 3/2007 | Taninaka ............ G06F 3/0622 711/114 |
| 2007/0101077 | A1 | 5/2007 | Evanchik et al. |
| 2007/0124407 | A1 | 5/2007 | Weber et al. |
| 2007/0156263 | A1 | 7/2007 | Gorzelic et al. |
| 2007/0162695 | A1 | 7/2007 | Ali et al. |
| 2007/0168049 | A1 | 7/2007 | Rao et al. |
| 2007/0168481 | A1 | 7/2007 | Lambert et al. |
| 2007/0204105 | A1 | 8/2007 | Lauffer et al. |
| 2008/0002694 | A1 | 1/2008 | Brahmaroutu et al. |
| 2008/0033972 | A1 | 2/2008 | Yin et al. |
| 2008/0126551 | A1 | 5/2008 | Conner et al. |
| 2008/0155094 | A1 | 6/2008 | Roese et al. |
| 2008/0201501 | A1 | 8/2008 | Partani et al. |
| 2009/0037655 | A1 | 2/2009 | Cherian et al. |
| 2010/0057987 | A1 | 3/2010 | Liu |
| 2010/0268925 | A1 | 10/2010 | Brisky et al. |
| 2010/0306773 | A1 | 12/2010 | Lee et al. |
| 2011/0072280 | A1 | 3/2011 | Chiasson et al. |
| 2011/0078293 | A1 | 3/2011 | Phung et al. |
| 2011/0173427 | A1 | 7/2011 | Merkin et al. |
| 2011/0264951 | A1 | 10/2011 | Pratt et al. |
| 2011/0289350 | A1 | 11/2011 | Andrews et al. |
| 2011/0296404 | A1 | 12/2011 | Zhang et al. |
| 2012/0110262 | A1 | 5/2012 | Zhang et al. |
| 2012/0198245 | A1 | 8/2012 | Mundt et al. |
| 2012/0317633 | A1 | 12/2012 | O'Donnell et al. |
| 2013/0024726 | A1 | 1/2013 | Andrews et al. |
| 2013/0205063 | A1 | 8/2013 | Zhang et al. |

OTHER PUBLICATIONS

Highbeam Research, "Nimsoft Team Up With Oracle", Printed From Internet May 26, 2009, 4 pgs.

All Business, "Oracle Releases F5 Management Plug-In Via iControl", Printed From Internet May 26, 2009, 4 pgs.

Warren Togami, "Remote Conversion to Linux Software RAID-1 for Crazy Sysadmins HOWTO", 2004, 11 pgs.

"Remote Raid/Mirror", HTMICenter, Printed From Internet Jul. 22, 2010, 2 pgs.

Power6 Information, "Installing an HA-two system Raid Configuration", Printed From Internet Jul. 22, 2010, 4 pgs.

Wikipedia, "License Manager" Printed from Internet Jun. 20, 2012, 2 pgs.

Phung et al. "Systems and Methods for Extension of Server Management Functions", U.S. Appl. No. 12/587,001; Office Action, Jun. 15, 2012, 11 pgs.

Phung et al. "Systems and Methods for Extension of Server Management Functions", U.S. Appl. No. 12/587,001; Amendment, Oct. 15, 2012, 16 pgs.

Phung et al., "Systems and Methods for Extension of Server Management Functions", U.S. Appl. No. 13/898,991, filed May 21, 2013, Preliminary Amendment, Jun. 27, 2013, 18 pgs.

Phung et al., "Systems and Methods for Extension of Server Management Functions", U.S. Appl. No. 13/898,991, filed May 21, 2013, Office Action, Apr. 23, 2014, 21 pgs.

Phung et al., "Systems and Methods for Extension of Server Management Functions", U.S. Appl. No. 13/898,991, filed May 21, 2013, Response to Office Action, Jul. 23, 2014, 9 pgs.

Zhang et al., "Systems and Methods for Remote Raid Configuration in an Embedded Environment", U.S. Appl. No. 12/925,673, filed Oct. 27, 2010, Office Action, Aug. 28, 2013, 27 pgs.

Zhang et al., "Systems and Methods for Remote Raid Configuration in an Embedded Environment", U.S. Appl. No. 12/925,673, filed Oct. 27, 2010, Response to Office Action, Nov. 29, 2013, 16 pgs.

Zhang et al., "Systems and Methods for Out of Band Backup and Restore of Hardware Profile Information", U.S. Appl. No. 13/365,901, filed Feb. 2, 2012, Office Action, Aug. 14, 2014, 23 pgs.

Zhang et al., "Systems and Methods for Out of Band Backup and Restore of Hardware Profile Information", U.S. Appl. No. 13/365,901, filed Feb. 2, 2012, Response to Office Action, Nov. 14, 2014, 26 pgs.

Zhang et al., "Systems and Methods for Out of Band Backup and Restore of Hardware Profile Information", U.S. Appl. No. 13/365,901, filed Feb. 2, 2012, Final Office Action, Mar. 11, 2015, 36 pgs.

Zhang et al., "Systems and Methods for Out of Band Backup and Restore of Hardware Profile Information", U.S. Appl. No. 13/365,901, filed Feb. 2, 2012, Response to Final Office Action, May 11, 2015, 26 pgs.

Zhang et al., "Systems and Methods for Intelligent System Profile Unique Data Management", U.S. Appl. No. 13/618,666, filed Sep. 14, 2012, Office Action, Dec. 16, 2013, 19 pgs.

Zhang et al., "Systems and Methods for Intelligent System Profile Unique Data Management", U.S. Appl. No. 13/618,666, filed Sep. 14, 2012, Response to Office Action, Mar. 14, 2014, 19 pgs.

Zhang et al., "Systems and Methods for Intelligent System Profile Unique Data Management", U.S. Appl. No. 13/618,666, filed Sep. 14, 2012, Final Office Action, Apr. 16, 2014, 16 pgs.

Zhang et al., "Systems and Methods for Intelligent System Profile Unique Data Management", U.S. Appl. No. 13/618,666, filed Sep. 14, 2012, Response to Final Office Action, Jun. 18, 2014, 21 pgs.

Zhang et al., "Systems and Methods for Intelligent System Profile Unique Data Management", U.S. Appl. No. 13/618,666, filed Sep. 14, 2012, Advisory Action, Jun. 25, 2014, 3 pgs.

Zhang et al., "Systems and Methods for Intelligent System Profile Unique Data Management", U.S. Appl. No. 13/618,666, filed Sep. 14, 2012, Response to Advisory Action, Jul. 16, 2014, 24 pgs.

* cited by examiner

SYSTEMS AND METHODS FOR OUT-OF-BAND BACKUP AND RESTORE OF HARDWARE PROFILE INFORMATION

This application is a continuation of pending U.S. patent application Ser. No. 13/365,901, filed on Feb. 3, 2012 and entitled "Systems And Methods For Out-Of-Band Backup And Restore Of Hardware Profile Information," the entire disclosure of which is incorporated herein by reference.

FIELD OF THE INVENTION

This invention relates generally to information handling systems and, more particularly, to out-of-band backup and/or restore of information handling system components.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Numerous solutions exist for backup and restore of data on an information handling system. Solutions that execute in the information handling system are deemed in-band solutions. Conventional in-band backup and restore operations are managed and performed by a software application executing with a host operating system on a host central processing unit (CPU).

SUMMARY OF THE INVENTION

Disclosed herein are systems and methods that may be implemented for out-of-band backup and/or restore of information handling system components. Such out-of-band backup and restore operations may be performed, in one embodiment, to backup and/or restore hardware profile information for an information handling system. In such an embodiment, hardware profile information may include firmware images and corresponding system configuration information (i.e., rather than system software such as host operating system (OS) and associated software applications and data), and the backup and restoration of the hardware profile information may be implemented using out-of-band processing devices (e.g., service processor/s, embedded processor/s, etc.). Following restoration of firmware images and configuration therefor, the restored system firmware may be booted to allow further operations. In one exemplary embodiment, the disclosed systems and methods may be implemented to provide hardware profile restoration checkpoints, e.g. to allow a return from a more recent firmware image and/or configuration settings for same to a previous system firmware image and configuration settings for the same. This checkpoint capability may be implemented, for example, to return a system hardware profile to a "bare-metal" system condition such as described further herein.

The disclosed out-of-band backup and restore operations may be performed in one embodiment using one or more out-of-band processing devices that are separate and independent from any in-band host central processing unit (CPU) that runs the host OS of the information handling system, and without management of any application executing with a host OS on the host CPU. Moreover, a remote system manager may also be provided with the ability to manage and control an out-of-band processing device from across an out-of-band network to perform out-of-band firmware backup and/or restore operations. Examples of system firmware information that may be backed up and/or restored using the disclosed systems and methods include, but are not limited to, firmware and configurations therefor, e.g., such as system platform basic input/output system (BIOS) firmware, motor control (MC) firmware, redundant array of independent disks (RAID) firmware, network interface card (NIC) firmware, Remote Access Controller firmware, etc. Thus, the disclosed out-of-band backup and restore operations may be implemented, for example, to restore hardware profile information and then load an operating system (OS) such a Linux, or configure/reconfigure RAID settings (e.g., back to RAID 1 configuration) on an information handling system. It will be understood that a restore request may also include a request to initially load hardware profile information for the first time, as well as request to reload previously backed up hardware profile information.

In one exemplary embodiment, the disclosed systems and methods may be implemented at a low level working layer to perform a full backup and restore of hardware profile information (e.g., firmware configurations) for an information handling system that exists in a "system down" or a "bare-metal" state. In system down state, an OS may be installed but the host CPU is down (e.g., halted or powered off). In such a system down state, an out-of-band processing device may be employed to control system hardware. A bare-metal system may be, for example, configured with an out-of-band processing device (e.g., service processor, embedded processor, etc.) that is not configured with proper firmware and/or firmware credentials for use. One example of a type of bare-metal information handling system is an information handling system configured with no host operating system (OS) to boot from (e.g., as may be provided from the factory or assembly plant with no host OS yet installed). A bare-metal information handling system may also be an information handling system that is configured with OS software and firmware, but that is not yet set up for use with proper firmware configurations and credentials for proper operation. A bare-metal system may also be, for example, a decommissioned system in which all firmware and user data, applications and the host OS has been removed (e.g., by secure delete) from the system drives. Another example of a bare-metal system is a redundant array of independent disks (RAID) system that does not have the proper RAID controller configuration yet installed (e.g., for virtual disk creation) to allow for OS installation. In one exemplary embodiment, such a bare-metal information handling system may have no applications or other user information resident on the main storage of the system (e.g., hard drive or solid state drive (SDD) containing no data and being only formatted or reformatted), and may in one example have only a hardware configuration agent and/or factory default firmware configurations stored (e.g., on system persistent storage).

The disclosed systems and methods may be advantageously employed to utilize a programmed out-of-band processor to perform full out-of-band firmware backup and restore operations for firmware and/or firmware configurations. Exemplary operations with which such a capability may be useful include, but are not limited to, out-of-band full firmware backup and restore during replacement of a motherboard of an information handling system e.g., where there is no OS, no agent, and no pre-installed software present on the system. In one exemplary embodiment, the disclosed systems and methods may be implemented to program and utilize an out-of-band processor to perform a full out-of-band firmware and firmware configuration backup in response to a single command, and then to restore the firmware and/or firmware configurations to its original state and/or settings as represented by the contents of the backup with a subsequent command.

The disclosed systems and methods may be implemented in one exemplary embodiment to enable users and field technicians to fully backup and restore BIOS and firmware in virtually any information handling system state, including "bare metal" or "system down" state. In one exemplary embodiment of a backup operation, at least an operable portion of the hardware profile configuration and payloads (e.g., BIOS firmware image, RAID controller firmware image, service processor firmware image, etc.) for information handling system hardware components may be saved to an image in a targeted save location, e.g., in embedded persistent storage of the information handling system and/or to external storage such as external non-volatile random access memory (e.g., such as removable vFlash) or a mounted (e.g., network) shared location (e.g., Windows network file system NFS, common Internet file system CIFS; HTTP webserver, etc.) A restore operation may be performed by using an operation that is performed in reverse to the backup operation in order to retrieve the configuration and payload information image from the targeted save location, and to place the retrieved image back on the source device/s and partition/s thereof.

In one respect, disclosed herein is an information handling system, including: one or more processing devices; operational storage coupled to the one or more processing devices, the operational storage configured to maintain hardware profile information for use by processing devices of the information handling system; and a backup and/or restore framework. The one or more processing devices may be configured (e.g., programmed) to execute the backup and/or restore framework to: receive a request from at least one of a local user or remote user for at least one of backup or restore of hardware profile information, and to provide the received backup or restore request to the one or more processing devices for processing. The one or more processing devices may also be configured to respond to the received backup or restore request in an out-of-band manner to at least one of: backup the hardware profile information by transferring the hardware profile information from an operational storage location on the information handling system to a backup storage location, or restore the hardware profile information by transferring the hardware profile information from a backup storage location to an operational storage location on the information handling system.

In another respect, disclosed herein is a method for backing up and/or restoring hardware profile information on an information handling system, the method including providing an information handling system that includes one or more processing devices, and operational storage coupled to the one or more processing devices, the operational storage configured to maintain hardware profile information for use by processing devices of the information handling system. The method may further include receiving a request in the information handling system from at least one of a local user or remote user for at least one of backup or restore of hardware profile information on the information handling system; and using the one or more processing devices to respond to the received backup or restore request in an out-of-band manner to at least one of: backup the hardware profile information by transferring the hardware profile information from an operational storage location on the information handling system to a backup storage location, or restore the hardware profile information by transferring the hardware profile information from a backup storage location to an operational storage location on the information handling system.

DESCRIPTION OF ILLUSTRATIVE EMBODIMENTS

Figure 1:
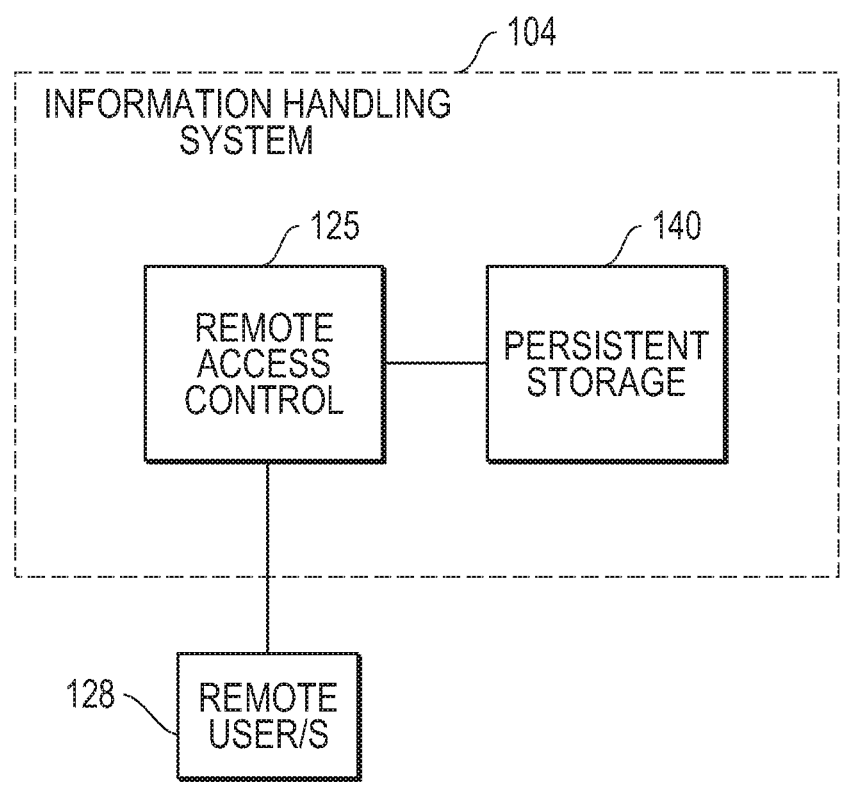
FIG. 1 is a simplified block diagram of an information handling system configured according one exemplary embodiment of the disclosed systems and methods.

FIG. 1 shows illustrates an information handling system 104 according to one exemplary embodiment of the disclosed systems and methods. As shown, information handling system 104 includes a remote access controller 125 coupled to persistent storage 140. As will be described further herein remote access controller 125 includes at least one out-of-band processor and associated memory. Also shown in FIG. 1 are remote user/s 128 that may be provided remote access to restore and access hardware profile information on system 104 from a remote location in a manner as will be described further herein.

Figure 2:
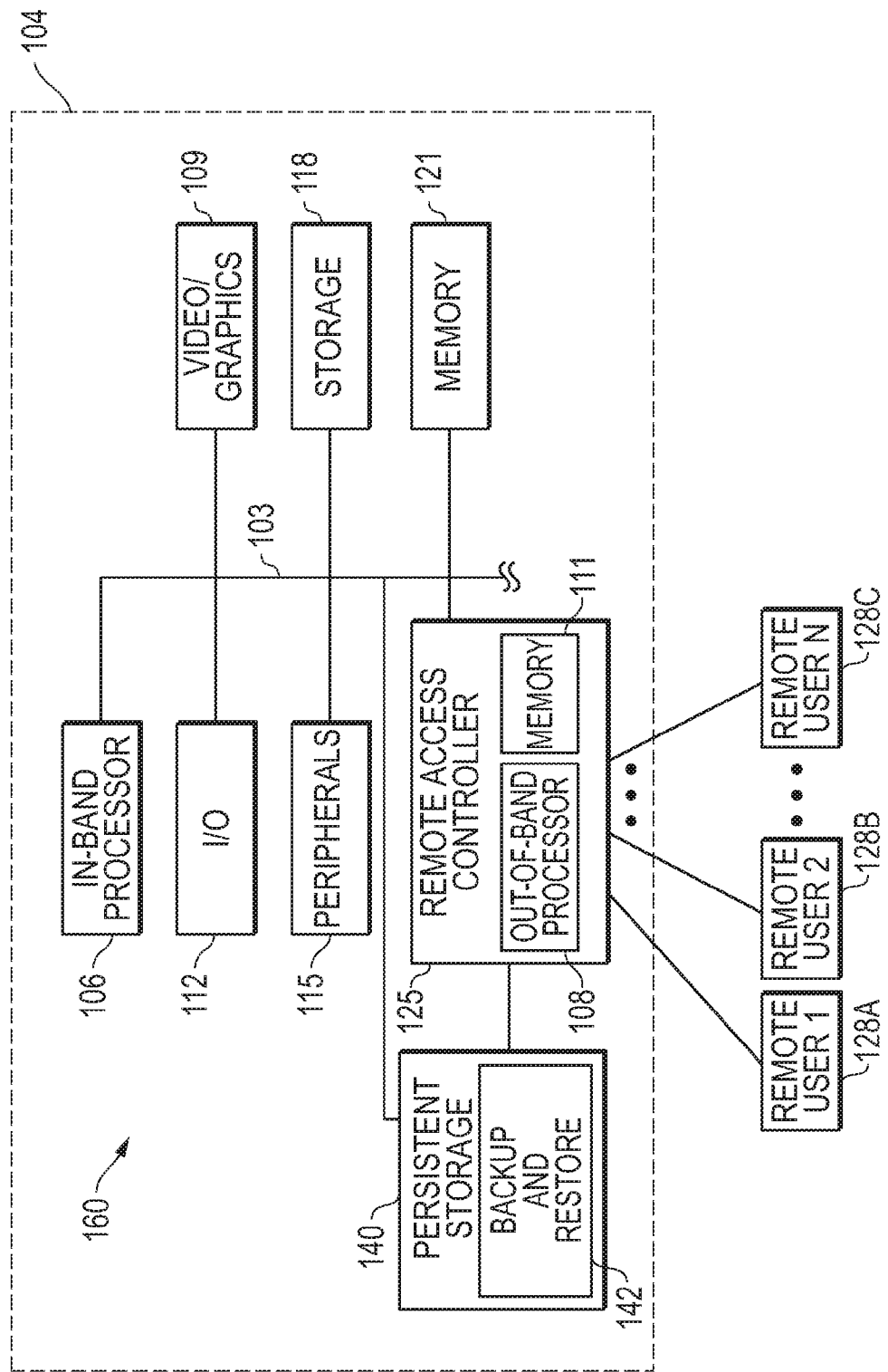
FIG. 2 is a simplified block diagram of an information handling system according to one exemplary embodiment of the disclosed systems and methods.

FIG. 2 is a block diagram of an information handling system 104 as it may be configured according to one exemplary embodiment. As shown, system 104 may include one or more in-band processors 106 (e.g., host CPUs), one or more buses or communication media 103, video/graphics hardware 109, storage 118, memory 121, local input/output (I/O) 112, peripherals 115, and remote access controller 125 having one or more out-of-band processors 108 and memory 111. Bus 103 provides a mechanism for the various components of system 104 to communicate and couple with one another. In-band processor 106 may include a Host processor (e.g., CPU) running a host operating system (OS) for RAID system server 160, and out-of-band processor 108 may be a service processor, embedded processor, etc. Video/graphics 109, storage 118, memory 121, I/O 112 and peripherals 115 may have the structure, and perform the functions known to those of skill in the art. Besides memory 121 (e.g., RAM), processor 106 may include cache memory for storage of frequently accessed data, and storage 118 may include extended memory for processor 106.

It will be understood that the embodiment of FIG. 2 is exemplary only, and that an information handling system may be provided with one or more processing devices that may perform the functions of processor 106, processor 108, remote access controller 125, and other optional processing devices. Examples of such processing devices include, but are not limited to, central processing units (CPUs), embedded controllers, microcontrollers, application specific integrated circuits (ASICs), field programmable gate arrays (FPGAs), etc. It will also be understood that the particular configuration of FIG. 2 is exemplary only, and that other information handling system architectures may be employed in the practice of the disclosed systems and methods. For example, in one embodiment, a RAID controller circuit (e.g., RAID card such as PowerEdge RAID Controller (PERC) card available from Dell, Inc.) and RAID storage may be communicatively coupled to bus 103. Such a RAID controller circuit may be optionally present for controlling transfer of data to and from the optional RAID storage. Further information on RAID controller circuits may be found, for example, in U.S. patent application Ser. No. 12/586,368, filed on Sep. 21, 2009; and in U.S. patent application Ser. No. 12/925,673, filed on Oct. 27, 2010; each of which are incorporated herein by reference in its entirety for all purposes.

The disclosed systems and methods may be implemented in one exemplary embodiment using a plug-in architecture framework to allow extension of system management functionalities (e.g., using Dell unified server configurator ("USC") server management functionalities available from Dell Products L.P. of Round Rock, Tex.) in a unified extension firmware interface ("UEFI") environment by leveraging available remote access controller core or optional flash memory space. Further information on implementation of USC functionalities in a UEFI environment may be found, for example, in U.S. patent application Ser. No. 12/587,001 filed Sep. 30, 2009, and incorporated herein by reference in its entirety for all purposes. Among other things, the disclosed systems and methods may be implemented to provide a hardware and software interface to allow use of a plug-in framework in the embedded system management that may be run under the BIOS firmware and the UEFI environment. The disclosed systems and methods may also be implemented to provide a USC management architecture that may be modified and enhanced over time, and/or that may also be employed to extend availability of the USC management framework to remote users 128.

Still referring to FIG. 2, remote access controller 125 provides access to a plurality of remote users 128A-128C, although access may be provided to a single user 128 in other embodiments. In this regard, remote access controller 125 allows remote users to manage, administer, use, and/or access various resources of host system 104 (e.g., either native or virtual) from a remote location. However, remote access may be provided to information handling system 104 using any other configuration suitable for accomplishing the out-of-band hardware profile restore and backup functions as described further herein.

In the embodiment of FIG. 2, remote users 128A-128C may have in-band or out-of-band access to system 104 as desired. For example, remote users 128A-128C may have wired and/or wireless access through a local area network (LAN), wide area network (WAN), wireless local area network (WLAN), wireless wide area network (WWAN), dial-up modem, etc. In one embodiment, remote access controller 125 may be an integrated Dell Remote Access Controller (iDRAC) available from Dell Products L.P. of Round Rock, Tex. Further information on such a remote access controller may be found in United States Patent Application Publication Number 2006/0212143 and United States Patent Application Publication Number 2006/0190532, each of which is incorporated herein by reference in its entirety. However, it will be understood that other configuration of remote access controllers may be suitably employed in other embodiments.

As further shown, remote access controller 125 is coupled to remote access controller persistent storage 140 (e.g., embedded and partitioned flash memory, Electrically Erasable Programmable Read Only Memory—EEPROM, etc.), upon which one or more management applications forming part of a USC framework may be stored in addition to one or more components or applications forming part of out-of-band hardware profile backup and/or restore framework 142 and other functions, e.g., BIOS, unified extensible firmware interface ("UEFI") modules, etc. In the embodiment of FIG. 1, persistent storage 140 is managed by remote access controller 125 and may be utilized for out-of-band hardware profile management. Remote access controller 125 may also access and execute components and/or applications forming part of out-of-band hardware profile backup and/or restore framework 142. In one exemplary embodiment, persistent storage 140 may be embedded in the system motherboard and may be, for example, about 1 GB in size. In another exemplary embodiment, remote access controller 125 may be embedded in the system motherboard. As used herein, the term "embedded" means integrated within the system, subsystem or chassis.

Figure 3:
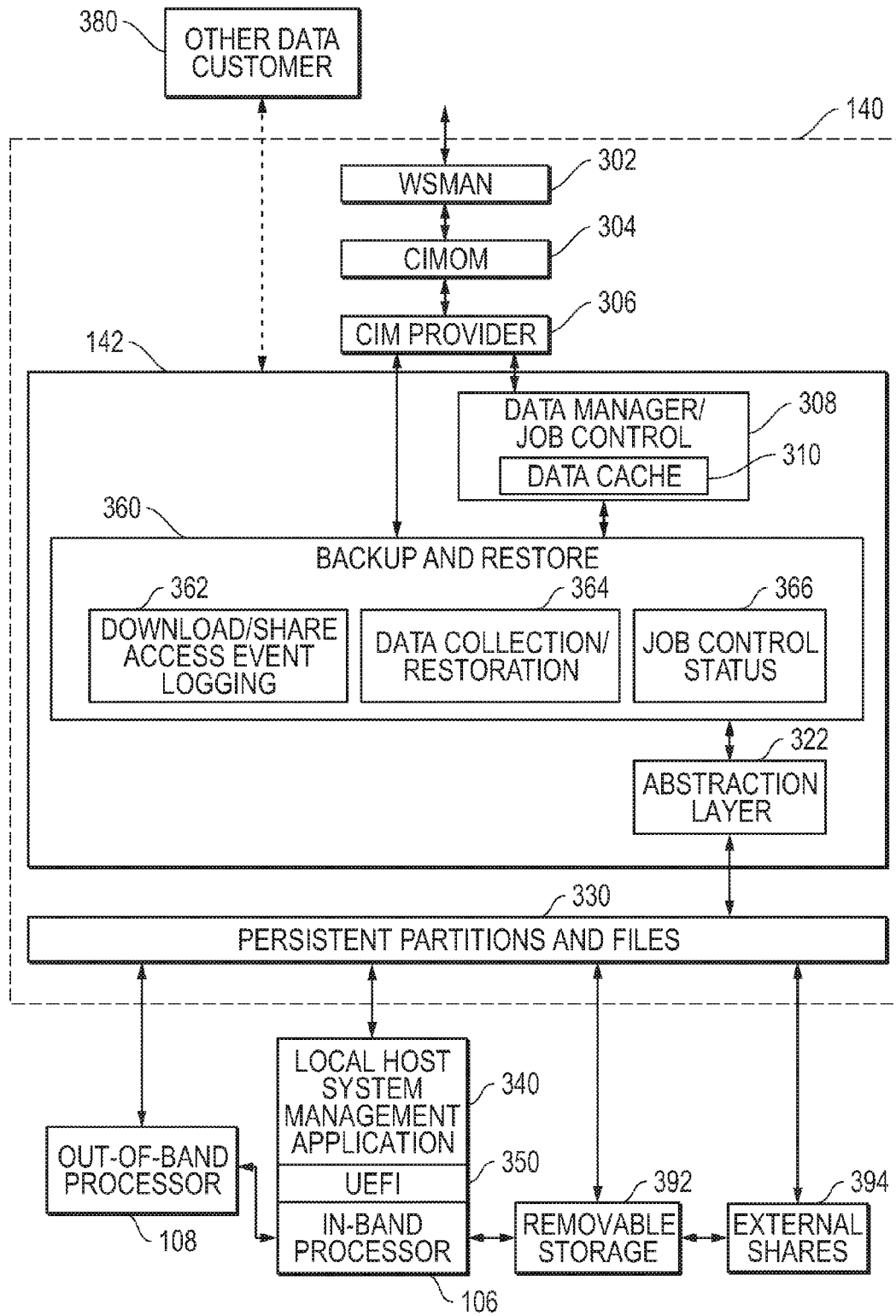
FIG. 3 shows how out-of-band hardware profile backup and/or restore framework as it may be configured according to one exemplary embodiment of the disclosed systems and methods.

FIG. 3 shows how out-of-band hardware profile backup and/or restore framework 142 of persistent storage 140 may be configured in one exemplary embodiment to interface with other components of information handling system 104, e.g., and to be executed as software and/or firmware programming by remote access controller 125. As shown in FIG. 3, a remote client interface 302 may be configured to receive configuration commands from a remote client via remote access controller 125 using an appropriate protocol for the particular interface 302, e.g., to allow one or more remote user/s 128 to remotely backup and/or restore hardware profile information (e.g., firmware images and corresponding system configuration information) in an out-of-band manner that is performed separately from in-band (e.g., Host) processor 106 and the associated operating system of information handling system 104. A remote client interface 302 may be a standards-based interface such as a Web Services for Management (WS-MAN") protocol interface layer as shown or may be any other suitable interface technology. As further shown in FIG. 3, an optional object manager 304 (e.g., common information model object manager "CIMOM" or other suitable object manager) may be optionally employed to facilitate communication with the out-of-band hardware profile backup and/or restore framework 142 and also management by a variety of types of remote users 128. Additionally, other data consumer/s 380 (e.g., command line interface "CLI" utility, webpage; etc.) may be optionally provided with the capability of communicating with components of out-of-band hardware profile backup and restore framework 142 as shown.

As further shown in FIG. 3, a provider layer 306 may be present in communication with the remote client interface 302 to receive and interpret client hardware profile backup and/or restoration job requests. In the illustrated embodiment, provider layer 306 is configured as a common information model (CIM) provider layer corresponding to CIMOM 304, although any other type and/or configuration of provider layer suitable for communicating with a particular client interface 302 and/or object manager 304 may be employed. As illustrated, provider layer 306 may be configured to send a backup or restore request via an optional bi-directional data manager/job control layer 308 (e.g., acting in part as a cache layer that speeds up communication) to components of a backup and restore orchestrator (BRO) layer 360.

Data manager/job control layer 308 may act to manage the queue of backup and restore jobs, and may include a data cache layer 310 that is present to allow backup and/or restore hardware profile parameters and data (e.g., firmware and firmware configurations) to be cached in memory before being committed to a storage location, e.g., in persistent partitioned file/s 330 on persistent storage 140 and/or to optional non-volatile memory device 392 (e.g., VFLASH, insertable and removable memory device such as USB key or thumbdrive, etc.), the latter which may be non-removable or which in one embodiment may be a removable device when present. Data manager/job control layer 308 may also be optionally configured to control the invocation and tracking of hardware profile backup and restoration configuration jobs. It will be understood that the particular configuration of data manager/job control layer 308 is exemplary, and that it is not necessary that layer 308 be present.

As shown in FIGS. 2 and 3, persistent storage 140 may be accessible via both in-band processor 106 (e.g., system Host processor running user operating system, etc.) and out-of-band processor 108 (e.g., service processor, embedded processor, etc.) of the information handling system 104 in order to share stored hardware profile parameters and data. Local host system and management application module/s 340 (e.g., including UEFI components) may be running as shown on in-band processor 106 as shown for purposes of viewing and manipulating system configurations, and local host system and management application module/s 340 may communicate with out-of-band processor 108 via IPMI. It will be understood that in-band processor 106 may in one exemplary embodiment be booted using out-of-band control for purpose of executing local host system and management application module/s 340. A low level abstraction layer 322 may be present to abstract the format of the database from other entries, and to generate hardware profile backup and restoration configuration tasks and store the operation sequence in a persistent file/s 330 on persistent storage 140. One or more hardware profile backup and restoration configuration interface modules 350 (e.g., unified extension firmware interface "UEFI" modules) may be provided to carry out the RAID configuration tasks. Persistent store abstraction layer 322 may be provided and configured to enable communication between processes running in different environments and context may be provided as shown to facilitate communication components of persistent storage 140.

Also shown in FIG. 3 are BRO layer 360 that are provided to communicate between Data Manager/Job Control layer 308 and abstraction layer 322. In this exemplary embodiment, components of BRO layer 360 may include download/share access event logging 362, data collection/restoration 364, and job control status 366. Download/share access event logging 362 may be present to indicate success or problems with accessing backup or restore data. Data collection/restoration 364 may be present to indicate success or problems encountered in collecting or restoring backup or restore data. Job control status 366 may be present to indicate the current status, current operation being performed, or percent completion.

FIG. 3 also shows persistent store abstraction layer 322 that may be present to interface with components of BRO layer 360. As so provided, abstraction layer 322 may be configured to determine what database information is needed to perform a requested hardware profile backup or restoration job, and to access the database and retrieve the needed information to support the job. Access and management of persistent storage partitions/files 330 and/or to external NVRAM 392 may be also be provided by persistent store abstraction layer 322. Also shown in FIG. 3 is optional external shares 394 that represent network storage access.

Figure 4:
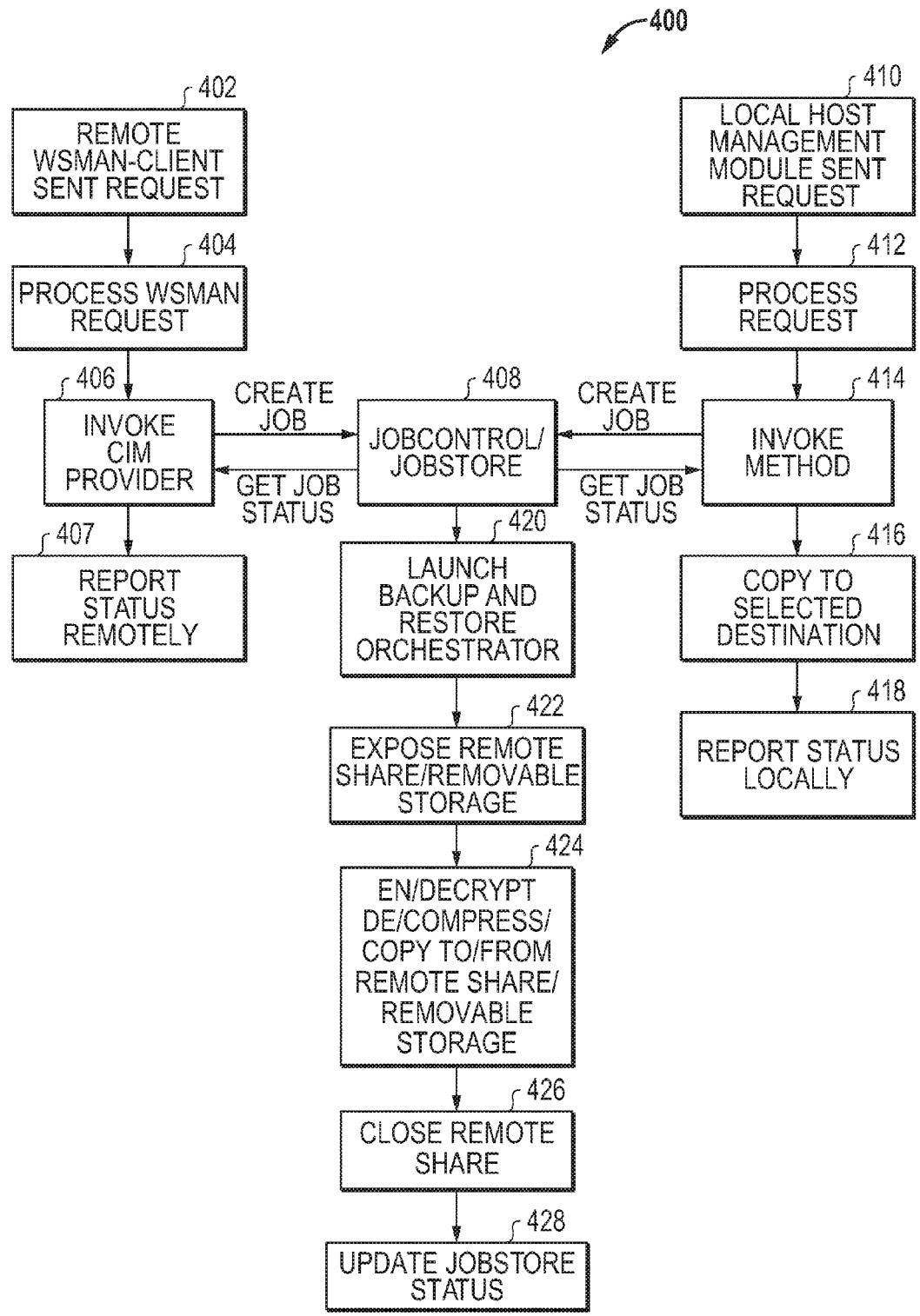
FIG. 4 illustrates methodology for out-of-band hardware profile backup and/or restoration according to one exemplary embodiment of the disclosed systems and methods.

FIG. 4 illustrates exemplary embodiment of methodology 400 for out-of-band hardware profile backup and/or restoration as it may be performed by remote access controller 125 and out-of-band processor 108 for an information handling system 104, e.g., using out-of-band hardware profile backup and/or restore framework 142 of persistent storage 140. It will be understood that during the time that a requested backup or restore operation is in progress, all other operations (e.g., such as reboots, updates and configurations) may be blocked and other backup or restore requests may be denied. Further only certain view operations may be made available during this time.

As shown, in step 402 out-of-band processor 108 (e.g., acting as a backup and restore request processor) may receive a backup or restore client request command via WSMAN 302 from a remote user 128 via embedded remote out-of-band hardware profile backup and/or restore framework 142 which operates to process the request in the manner as previously described and illustrated. The backup or restore client request command may relate to backup or restoration of hardware profile information such as firmware (and firmware configurations therefor) including, but not limited to, system platform basic input/output system (BIOS) firmware, motor control (MC) firmware, redundant array of independent disks (RAID) firmware, network interface card (NIC) firmware, Remote Access Controller firmware, etc. In response to a backup request, such hardware profile information may be retrieved from a given operational storage location on information handling system 104 (e.g., such as persistent storage 140) for backup to a designated backup storage location (e.g., such as NVRAM 392 or external network shared storage 394). Operational storage locations may also be a file transfer protocol (FTP) site, network share site (network file system "NFS" or common internet file system "CIFS"), hypertext transfer protocol (HTTP) site, etc. In the case of a restore request, such hardware profile information may be retrieved from a given separate storage location (e.g., such as NVRAM 392 or external network shared storage 394) for transfer to a operational storage location on information handling system 104 (e.g., such as persistent storage 140).

The given received request of step 402 may be processed in step 404 by CIMOM 304, before invoking CIM provider 306 in step 406 to serve the WSMAN/CIMOM request, e.g., by sending a backup or restore request to data manager/job control layer 308 in order to create the given backup or restore job. The backup or restore request sent to data manager/job control layer 308 by CIM provider 306 in step 406 may include the address information required to either construct a new backup file (for a requested backup operation) or read the backup file (for a requested restore operation), and to access the designated storage location for the backup file. In step 408, data manager/job control layer 308 may then generate a new backup or restore job in the job store and validate the destination, as appropriate. In this regard, data manager/job control layer 308 may store the hardware profile parameters and data of the requested job in data cache 310 where it is preserved, e.g., in case of later job interruption. It is noted that WSMAN commands may be processed by the corresponding provider/s responsible for backup and restore functions. Thus, the WSMAN request may be sent via secure HTTP request and processed by the CIMON service and dispatched to corresponding provider/s with invoking methods and attributes.

As further shown in FIG. 4, in step 408 data manager/job control layer 308 may also track the status of each hardware profile backup or restore job and provide the job status to CIM provider 306 for reporting to a remote user in step 407, e.g., through WSMAN 302. In this regard, CIM provider 306 may be configured to query the current real time status of the backup or restore process of a given job by requesting the job status from data manager/job control layer 308, and reporting the status to a remote user in real time, e.g., by graphical user interface. Status information that may be so displayed includes, but is not limited to, what job task is running and what stage the backup or restore is in. Percentage task completion may be derived and displayed based on the stages and steps completed as compared with the total number of steps within each stage.

Still referring to FIG. 4, methodology 400 out-of-band hardware profile backup and/or restoration may also be performed by remote access controller 125 and out-of-band processor 108 in response to a local backup or restore job request received from a local user via local host system and management application module/s 340, UEFI 350, and in-band processor 106. As shown, in step 410, out-of-band processor 108 may receive a backup or restore client request command from a local user via in-band processor 106 (e.g., host CPU) and local host system and management application 340. This request may be processed by persistent store abstraction layer 322 in step 412, which may invoke the out-band hardware profile backup or restore method in step 414 by sending a backup or restore request to data manager/job control layer 308 in order to create the given backup or restore job. As previously described, data manager/job control layer 308 responds in step 408 by queuing and invoking the given hardware profile backup or restore job, and by storing the hardware profile parameters and data of the requested job in data cache 310 where it is preserved, e.g., in case of later job interruption.

As previously described, data manager/job control layer 308 may also track the status of each hardware profile backup or restore job in step 408. However, in the case of a local request from a local user, data manager/job control layer 308 may provide (e.g., copy) the job status to local storage (e.g., such as a removable USB key/thumb drive device or other suitable storage device) in step 416, and may additionally or alternatively report the job status to a local user (e.g., via graphical user interface on the screen of a local console using video/graphics 109) in step 418. Job status may also be additionally or alternatively reported through remote service method and returned as a query response. In any case, the provided job status information may be of similar form and content to that previously described in relation to step 407 of FIG. 4. In this regard, persistent store abstraction layer 322 may be configured to query the current real time status of the backup or restore process of a given job in a manner similar to that performed by CIM provider 306 in step 407, e.g., by requesting the job status from data manager/job control layer 308, and reporting the status to a local user in real time, e.g., by graphical user interface. As before, status information that may be so displayed includes, but is not limited to, what job task is running and what stage the backup or restore is in. Percentage task completion may be derived and displayed based on the stages and steps completed as compared with the total number of steps within each stage.

Whether processing a local or remote hardware profile backup or restore request, methodology 400 proceeds from step 408 to step 420, where backup and restore orchestrator (BRO) layer 360 is launched on out-of-band processor 108. BRO layer 360 prepares to make the storage area available to remote access controller 125 that corresponds to the designated backup location address information stored in step 408, either as a destination for backup information or as a source/service for restore information. In this regard, all credentials and access may be checked in step 420 by download/share access event logging module 362 of BRO layer 360 for external network shares, e.g., where a designated backup location address corresponds to external network storage shares 394 of FIG. 3. In the case where a designated backup location address corresponds to attached NVRAM removable storage 392 (e.g., vFLASH persistent storage), space and access in the NVRAM may be checked by module 362 of BRO layer 360 in step 420. It will be understood that a designated backup location address may be selected that corresponds to any other external or internal (e.g., embedded) storage location that is suitable for storing hardware profile data and parameters.

After the tasks of step 420 are completed and the storage area corresponding to the designated backup location has been checked and verified according to the type of storage device involved, methodology 400 proceeds to step 422 where the storage device (e.g., external network shares 394 or NVRAM 392) and corresponding designated backup location address thereon is exposed by module 362 of BRO layer 360 to the remote access controller 125. Next, the backup hardware profile data, parameters, and payload for a requested backup job will then be optionally compressed and encrypted using data collection/restoration module 364 of BRO layer 360 running on the out-of-band processor of remote access controller 125 prior to storage by module 364 in the designated backup location address in step 424. In the case of a requested restore job, requested restore hardware profile data, parameters and payload may be retrieved by module 364 in optional compressed encrypted from the designated backup location address and optionally decompressed and decrypted by the out-of-band processor of remote access controller 125 in step 424. A retrieved backup image may also be optionally validated (e.g., by making sure that payload has not been tampered with) by BRO layer 360 before proceeding further than step 424. Methodology 400 may terminate upon backup image validation failure, e.g., with display of optional error message to the given requested remote or local user. With regard to the above discussion, it will be understood that data is used as a generic term, while parameter is a set of attributes or data, and a payload is a package of data that serves a specific purpose and that may be delivered in a chunk.

Next, in step 426 any external remote share network access open for remote access controller 125 may be closed by module 362 of BRO layer 360. Then in step 428, job control status module 366 of BRO layer 360 may check to verify what portion of the original requested backup or restore job has been completed, and update the job status of data manager/job control layer 308 to include this current status. In the case of a restore job task, such as installation of firmware like BIOS, multiple steps may be required. For example, module 366 of BRO layer 360 may verify in step 428 that a new BIOS image has been installed (e.g., restored from backup or initially installed) from an external source. Such a BIOS image may be, for example, an updated, new or replacement BIOS image. After verifying that the BIOS image has been installed, module 366 of BRO layer 360 may optionally reboot (power cycle) information handling system 104, prior to proceeding with configuration of the now installed (e.g., updated) BIOS image. However, it will be understood that reboot is not required, and that a restore operation may be initiated without requiring reboot.

Figure 5:
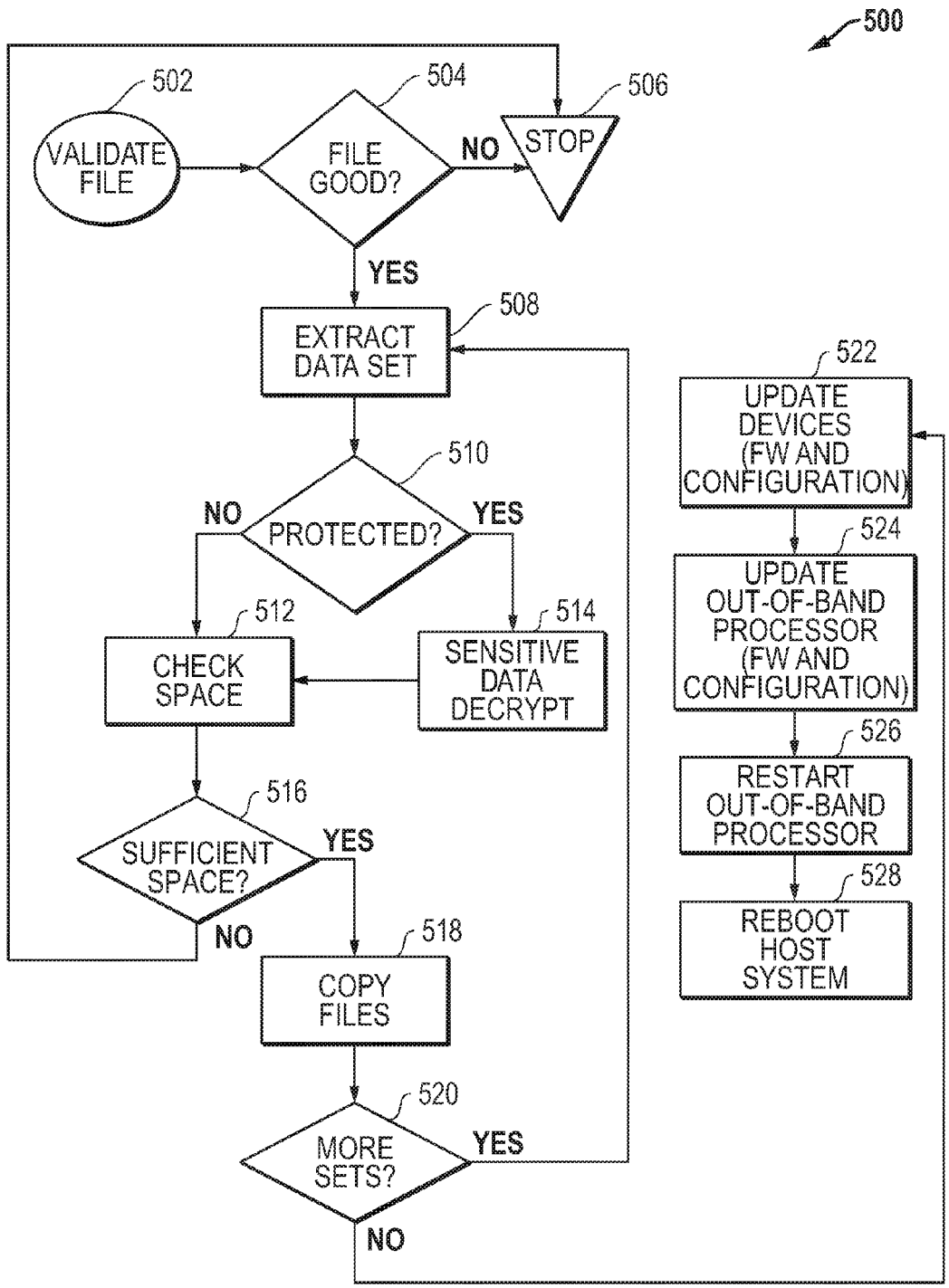
FIG. 5 illustrates restore methodology according to one exemplary embodiment of the disclosed systems and methods.

FIG. 5 illustrates one exemplary embodiment of restore methodology 500 that as it may be performed by remote access controller 125 and out-of-band processor 108 for an information handling system 104, e.g., using out-of-band hardware profile backup and/or restore framework 142 of persistent storage 140. In this embodiment, one or more requested files including one or more data sets (e.g. such as hardware profile information) may be requested for restoration by retrieval from a target given separate storage location (e.g., such as NVRAM 392 or external network shared storage 394) for transfer to a destination operational storage location on information handling system 104 (e.g., such as persistent storage 140). As shown, the requested file/s may be validated in step 502. If the requested file/s are note validated in step 504, methodology 500 terminates in step 506. However if the requested file/s are determined valid in step 506, then methodology 500 proceeds to step 508 as shown, where at least one data set is extracted for restoration from the target separate storage location to the destination operational storage location.

Still referring to FIG. 5, the extracted data set is examined in step 510 to determine if it is protected or encrypted. If the data set is determined to be encrypted, it is decrypted as appropriate in step 514. Methodology 500 then proceeds to step 512 where available space in the destination operational storage location is determined, and then to step 514 where required space for the requested file/s and data set/s from the separate storage location is compared to the available space in the target operational storage location. Methodology 500 terminates in step 506 if sufficient space for the requested data is found not to exist in the destination location. However, if sufficient space exists for the requested data in the destination location, then methodology 500 proceeds to step 518 where the requested file/s are copied from the target given separate storage location to the destination operational storage location. If additional requested data sets are found to exist in step 520, then methodology 500 repeats starting at step 508. However, if no additional requested data sets exist, then methodology 500 proceeds to step 522.

Next, in step 522, firmware images and configuration therefor for any implicated devices of information handling system 104 other than out-of-band processor 108 (e.g., service processor) are updated using the restored data as applicable. In step 524 firmware images and configuration therefor for out-of-band processor 108 (e.g., service processor) are updated using the restored data as applicable. Out-of-band processor 108 (e.g., service processor) is then rebooted in step 526, followed by rebooting of the host system 104 (with in-band processor 106) in step 528.

It will be understood that methodology 400 of FIG. 4 and methodology 500 of FIG. 5 are exemplary only and that fewer, additional, or alternative steps may be alternatively implemented for each in other embodiments. Furthermore, it will be understood that the configuration of the particular embodiments illustrated in FIGS. 1-3 is also exemplary, and that other configurations are possible. Further, in one exemplary embodiment, the disclosed systems and methods may be implemented to provide hardware profile restoration checkpoints, e.g. to allow a return from a more recent firmware image and/or configuration settings for same to a previous system firmware image and configuration settings for the same. This checkpoint capability may be implemented, for example, to return a system hardware profile to a "baremetal" system condition. For example, a hardware profile restoration checkpoint for a first hardware profile image and configuration settings for same may be created by transferring the hardware profile information corresponding to the first hardware profile image and configuration settings from an operational storage location on the information handling system to a backup storage location prior to changing the hardware profile image and configuration settings for same. Then the first hardware profile image and configuration settings for same of the checkpoint may be later restored after changing the hardware profile image and configuration settings for same by transferring the hardware profile information corresponding to the first hardware profile image and configuration settings for same of the checkpoint from a backup storage location to an operational storage location on the information handling system. This checkpoint capability may be implemented, for example, by checking the platform type, system serial number or version number. For example, a system's backup image maybe applied back to its source system. In this case, BRO layer 360 may fetch the serial number of the system captured in the backup image and deploy back to its original system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will be understood that one or more of the tasks, functions, or methodologies described herein (e.g., including those performed by remote access controller 125 and out of band processor/s 108) may be implemented by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium residing on or accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
one or more processing devices;
operational storage coupled to the one or more processing devices, the operational storage configured to maintain hardware profile information for use by processing devices of the information handling system, the hardware profile information including at least one of firmware images and system hardware configuration information, rather than host operating system (OS) and associated software applications and data; and
a backup and/or restore framework, the one or more processing devices being configured to execute the backup and/or restore framework to:
receive a request from at least one of a local user or remote user for at least one of backup or restore of hardware profile information, and
provide the received backup or restore request to the one or more processing devices for processing;
where the one or more processing devices are configured to respond to the received backup or restore request in an out-of-band manner while the information handling system is configured in a bare metal state or system down state to at least one of:
backup the hardware profile information by transferring the hardware profile information from an operational storage location on the bare metal or system down information handling system to a backup storage location, or
restore the hardware profile information by transferring the hardware profile information from a backup storage location or external source to an operational storage location on the bare metal or system down information handling system.

2. The system of claim 1, where at least one of the processing devices comprises an out-of-band processing device; and where the system further comprises:
persistent storage coupled to the one or more processing devices, the backup and/or restore framework being resident on the persistent storage;
a remote access controller, the remote access controller including the out-of-band processing device; and
a system motherboard, the remote access controller and the persistent storage being embedded components on the motherboard.

3. The system of claim 1, further comprising an out-of-band processing device that is configured to:
create at least one of a backup or restore job in response to the received backup or restore request; and
execute the created backup or restore job to back up the hardware profile information by transferring the hardware profile information from an operational storage location on the information handling system to the backup storage location, or to restore the hardware profile information by transferring the hardware profile information from the backup storage location or external source to the operational storage location on the information handling system.

4. The system of claim 3, further comprising at least one external input/output (I/O) interface coupled to the out-of-band processing device, the external I/O interface being configured for wired or wireless coupling to one or more devices that are external to the information handling system, where the out-of-band processing device is configured to receive the backup or restore request from a remote user across the external I/O interface; and where the out-of-band processing device is configured to execute the created backup or restore job in response to the remote backup or restore request to at least one of backup the hardware profile information by transferring the hardware profile information from an operational storage location on the information handling system to the backup storage location, or to restore the hardware profile information by transferring the hardware profile information from the backup storage location or external source to the operational storage location on the information handling system.

5. The system of claim 3, further comprising an in-band processing device different from the out-of-band processing device; and at least one local input/output (I/O) interface coupled to the in-band processing device, the in-band processing device being configured for receiving the backup or restore request from a local user across the local I/O interface; the in-band processing device being configured to provide a corresponding backup or restore job request to the out-of-band processing device; and where the out-of-band processing device is configured to execute the created backup or restore job in response to the local backup or restore job request to at least one of backup the hardware profile information by transferring the hardware profile information from an operational storage location on the information handling system to the backup storage location, or to restore the hardware profile information by transferring the hardware profile information from the backup storage location or external source to the operational storage location on the information handling system.

6. The system of claim 1, where the backup and/or restore framework is executable by the one or more processing devices to receive a request from at least one of a local user or remote user for backup of hardware profile information; and where the one or more processing devices are configured to respond to the received backup request in an out-of-band manner to back up the hardware profile information by transferring the hardware profile information from an operational storage location on the information handling system to a backup storage location.

7. The system of claim 6, where the operational storage location comprises at least one of a FTP site, NFS or CIFS network share site, or HTTP site; where the backup storage location comprises at least one of a removable NVRAM storage device or external network shared storage; and where the hardware profile information comprises at least one of firmware or firmware configuration information.

8. The system of claim 1, where the backup and/or restore framework is executable by the one or more processing devices to receive a request from at least one of a local user or remote user for restore of hardware profile information; and where the one or more processing devices are configured to respond to the received restore request in an out-of-band manner to restore the hardware profile information by transferring the hardware profile information from a backup storage location to an operational storage location on the information handling system.

9. The system of claim 1, where the backup and/or restore framework is executable by the one or more processing devices to create a hardware profile restoration checkpoint for a first hardware profile image and configuration settings for same by transferring the hardware profile information corresponding to the first hardware profile image and configuration settings from an operational storage location on the information handling system to a backup storage location prior to changing the hardware profile image and configuration settings for same; and then to later restore the first hardware profile image and configuration settings for same of the checkpoint after changing the hardware profile image and configuration settings for same by transferring the hardware profile information corresponding to the first hardware profile image and configuration settings for same from a backup storage location to an operational storage location on the information handling system.

10. The system of claim 1, where the one or more processing devices are configured to respond to the received backup or restore request in an out-of-band manner while the information handling system is configured in a bare metal state with no host operating system (OS) present to boot from to at least one of:
    backup the hardware profile information by transferring the hardware profile information from an operational storage location on the bare metal information handling system to a backup storage location; or
    restore the hardware profile information by transferring the hardware profile information from a backup storage location or external source to an operational storage location on the bare metal information handling system.

11. The system of claim 1, further comprising a host CPU; and where the one or more processing devices are configured to respond to the received backup or restore request in an out-of-band manner while the information handling system is configured in a system down state in which the host CPU of the information handling system is powered off to at least one of:
    backup the hardware profile information by transferring the hardware profile information from an operational storage location on the system down information handling system to a backup storage location; or
    restore the hardware profile information by transferring the hardware profile information from a backup storage location or external source to an operational storage location on the system down information handling system.

12. A method for backing up and/or restoring hardware profile information on an information handling system, the method comprising:
    providing an information handling system comprising:
        one or more processing devices,
        operational storage coupled to the one or more processing devices, the operational storage configured to maintain hardware profile information for use by processing devices of the information handling system, the hardware profile information including at least one of firmware images and system hardware configuration information, rather than host operating system (OS) and associated software applications and data;
    receiving a request in the information handling system from at least one of a local user or remote user for at least one of backup or restore of hardware profile information on the information handling system; and
    using the one or more processing devices to respond to the received backup or restore request in an out-of-band manner while the information handling system is configured in a bare metal state or system down state to at least one of:
        backup the hardware profile information by transferring the hardware profile information from an operational storage location on the bare metal or system down information handling system to a backup storage location, or
        restore the hardware profile information by transferring the hardware profile information from a backup storage location or external source to an operational storage location on the bare metal or system down information handling system.

13. The method of claim 12, further comprising providing an out-of-band processing device, and using the out-of-band processing device to perform the following steps in an out-of-band manner:
    creating at least one of a backup or restore job in response to the received backup or restore request; and
    executing the created backup or restore job to back up the hardware profile information by transferring the hardware profile information from an operational storage location on the information handling system to the backup storage location, or to restore the hardware profile information by transferring the hardware profile information from the backup storage location or external source to the operational storage location on the information handling system.

14. The method of claim 13, further comprising:
    providing at least one external input/output (I/O) interface coupled to the out-of-band processing device, the external I/O interface being configured for wired or wireless coupling to one or more devices that are external to the information handling system;
    receiving the backup or restore request in the out-of-band processing device from a remote user across the external I/O interface; and
    using the out-of-band processing device to execute the created backup or restore job in response to the remote backup or restore request to at least one of backup the hardware profile information by transferring the hardware profile information from an operational storage location on the information handling system to the backup storage location, or to restore the hardware profile information by transferring the hardware profile information from the backup storage location or external source to the operational storage location on the information handling system.

15. The method of claim 13, further comprising:
    providing an in-band processing device different from the out-of-band processing device, and at least one local input/output (I/O) interface coupled to the in-band processing device;
    using the in-band processing device to:
        receive the backup or restore request from a local user across the local I/O interface,
        provide a corresponding backup or restore job request to the out-of-band processing device; and using the out-of-band processing device to execute the created backup or restore job in response to the local backup or restore job request to at least one of:
  backup the hardware profile information by transferring the hardware profile information from an operational storage location on the information handling system to the backup storage location, or
  restore the hardware profile information by transferring the hardware profile information from the backup storage location or external location to the operational storage location on the information handling system.

16. The method of claim 12, further comprising performing the step of using the one or more processing devices to respond to the received backup or restore requests in an out-of-band manner while the information handling system is configured in a bare metal state while the information handling system is configured in a bare metal state with no host operating system (OS) present to boot from to at least one of:
  backup the hardware profile information by transferring the hardware profile information from an operational storage location on the bare metal information handling system to a backup storage location, or
  restore the hardware profile information by transferring the hardware profile information from a backup storage location to an operational storage location on the bare metal information handling system.

17. The method of claim 12, further comprising performing the step of using the one or more processing devices to respond to the received backup or restore requests in an out-of-band manner while the information handling system is configured in a system down state in which a host CPU of the information handling system is powered off to at least one of:
  backup the hardware profile information by transferring the hardware profile information from an operational storage location on the system down information handling system to a backup storage location; or
  restore the hardware profile information by transferring the hardware profile information from a backup storage location or external location to an operational storage location on the system down information handling system.

18. The method of claim 12, further comprising receiving a request in the information handling system from at least one of a local user or remote user for backup of hardware profile information; and using the one or more processing devices to respond to the received backup request in an out-of-band manner to back up the hardware profile information by transferring the hardware profile information from an operational storage location on the information handling system to a backup storage location.

19. The method of claim 12, further comprising receiving a request in the information handling system from at least one of a local user or remote user for restore of hardware profile information; and using the one or more processing devices to respond to the received restore request in an out-of-band manner to restore the hardware profile information by transferring the hardware profile information from a backup storage location to an operational storage location on the information handling system.

20. The method of claim 12, further comprising using the one or more processing devices to:
  create a hardware profile restoration checkpoint for a first hardware profile image and configuration settings for same by transferring the hardware profile information corresponding to the first hardware profile image and configuration settings from an operational storage location on the information handling system to a backup storage location prior to changing the hardware profile image and configuration settings for same; and
  then to later restore the first hardware profile image and configuration settings for same of the checkpoint after changing the hardware profile image and configuration settings for same by transferring the hardware profile information corresponding to the first hardware profile image and configuration settings for same from a backup storage location to an operational storage location on the information handling system.

\* \* \* \* \*